Feb. 25, 1969 W. L. STEINER 3,430,092

ELECTRONIC AREA CORRELATOR TUBE

Filed July 26, 1966

INVENTOR

WILFORD L. STEINER

BY: [signature]

ATTORNEY 3,430,092
Patented Feb. 25, 1969

1

3,430,092

ELECTRONIC AREA CORRELATOR TUBE

Wilford L. Steiner, Akron, Ohio, assignor to Goodyear Aerospace Corporation, Akron, Ohio, a corporation of Delaware Filed July 26, 1966, Ser. No. 568,015
U.S. Cl. 315—10 4 Claims
Int. Cl. H01j *31/26*

ABSTRACT OF THE DISCLOSURE

An electronic area correlator tube which electronically correlates two images on a simultaneous area basis without the necessity of using storage grids or meshes. The tube comprises a photocathode at one end and a photoconductor at the other end. The photocathode converts an optical image to an electronic image which is accelerated and focused onto the inside surface of the photoconductor. The photoconductor acts as a plurality of resistance elements, and in effect the resistance is changed by the presence of an optical signal on the outside surface thereof in combination with the electronic image on the inside surface. A voltage impressed across the photoconductor is measured in accordance with the resistance value thereacross as a current, with the amount of current indicating correlation on an instantaneous area basis.

This invention relates to an electronic area correlator tube which provides a simplified means for electronically correlating two optical images on a simultaneous area basis without the necessity of using storage grids or meshes.

Heretofore it has been well known that an electron image tube might be used for correlation technique, as particularly pointed out in patent application Ser. No. 232,961, filed Oct. 25, 1962, now Patent No. 3,290,546, for an Electron Image Correlator, and assigned to Goodyear Aerospace Corporation. However, these prior art techniques as evidenced by the above-identified application, utilize storage grids to effect correlation, making the tube more expensive, and further being unable to provide continuous correlation for tracking purposes.

Therefore, it is the general object of the present invention to avoid and overcome the foregoing and other difficulties of and objections to prior art practices by providing an electronic area correlator tube wherein correlation is achieved without the use of grids and is substantially continuous because of the specific configuration of the tube to allow constant updating.

A further object of the invention is to allow continuous correlation between two optical images in a single tube without the use of grids, which tube is low cost, easy to make, and reilable in operation.

The aforesaid objects of the invention and other objects which will become apparent as the description proceeds are achieved by providing in an electronic area correlator tube the combination of a vacuum tube, a photo cathode at one end of the tube to receive direct optical input images for conversion to electronic image patterns, a photoconductor at the other end of the tube in spaced parallel relation to the photo cathode, means to accelerate toward and to focus a present optical image onto the photo cathode, means to focus a reference optical image onto the photoconductor, coil means surrounding the tube between the photo cathode and the photoconductor to focus electronic image patterns from the photo cathode onto the photoconductor and to controllably deflect a focused electronic image pattern relative to the photoconductor, means to read the instantaneous current through the photoconductor which value is a function of the correlation between the two images, means to phase discriminate the instantaneous voltage signal developed in a load resistor in relation to the nutation of the electronic image, and means to integrate the discriminator outputs to produce an error signal which can be applied to the deflection circuits to effect closed-loop automatic tracking of the present optical image.

2

Figure 1:
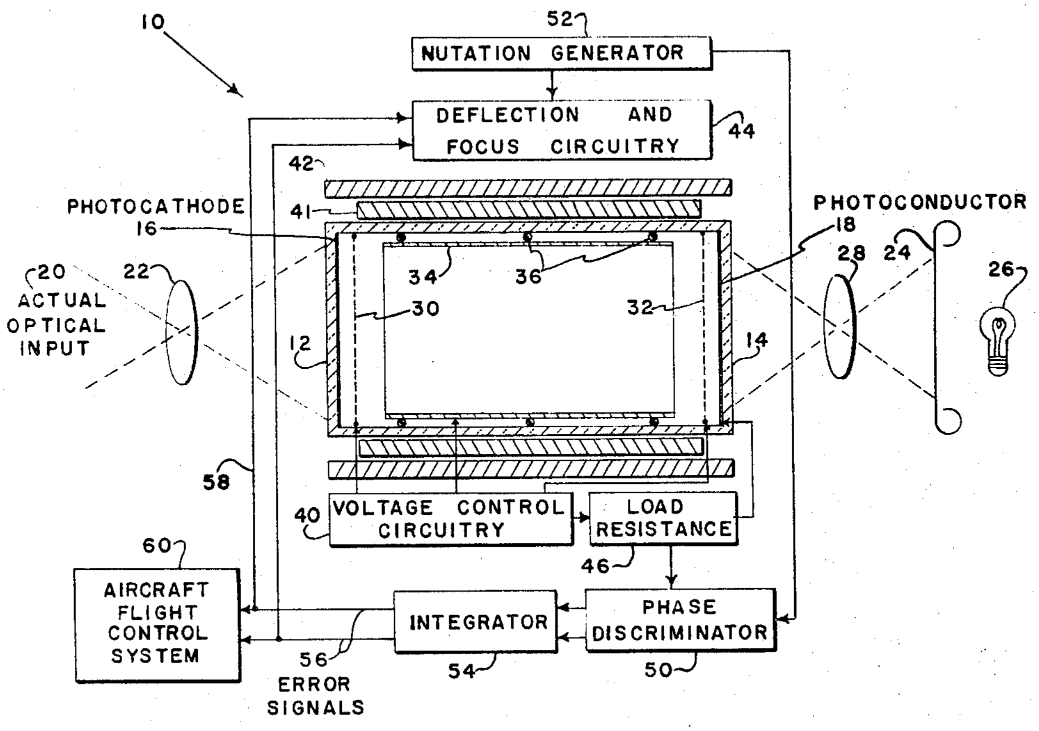
Figure 2:
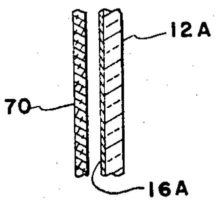

For a better understanding of the invention, reference should be had to the drawings wherein:

FIGURE 1 is a schematic illustration of the electronic area correlator tube representing the preferred embodiment of the invention with suitable block diagram circuitries associated therewith to achieve the desired function thereof; and FIGURE 2 is an enlarged cross sectional broken away modification of the photoconductor end plate which comprises a photo cathode and an electron sensitive target.

With reference to the form of the invention illustrated in the drawings, the numeral 10 indicates generally an image tube housing which is generally substantially cylindrically shaped, and has an optically clear protective glass covering 12 and 14 over each end thereof. In the usual manner, the housing 10 is drawn to a vacuum. At one end formed on the glass 12 is a photocathode 16, while at the other end a photoconductor 18 is formed on the glass 14. Thus, both the photocathode 16 and the photoconductor 18 are adapted to receive optical input images. To accomplish this purpose, the invention contemplates the photocathode 16 will receive an actual or present optical input image 20 properly focused thereon through a lens 22. A reference image from a reference film 24 backlighted by a bulb 26 is focused through the lens 28 onto the photoconductor 18.

In order to achieve the correlation features of the invention, each photosensitive surface has an adjacent field mesh electrode 30 and 32, respectively, mounted parallel thereto and in close spaced relationship; for example, ⅛ inch. The meshes 30 and 32 achieve acceleration and collimation of electron image as well known in the art. A conductive cylinder or drift tube 34 is mounted between the two ends to provide a unipotential field in which to deflect any electronic images accelerated down the tube. The tube 34 is mounted in insulated relationship to the tube 10 by suitable insulating rings 36.

The photocathode 16 and photoconductor 18 are separated by a distance sufficient to give good electron image focus and to permit reasonable deflection sensitivity. The tube dimensions may be, for example, about 3 inches in length and 1 inch in diameter. The tube may be designed for either magnetic or electrostatic focus and deflection. In the embodiment of the invention illustrated, an electronic image is generated at the photocathode 16 which is accelerated toward the photoconductor 18 by controlling the voltage on the field mesh 30 through a voltage control 40. Once the accelerated electron image enters the drift tube 34, it travels at substantially uniform velocity until it is decelerated by the voltage on the field mesh 32 from the voltage control 40. The control 40 also controls the voltage to the tube 34, as indicated in FIGURE 1. In order to achieve deflection in the drift tube 34, and focus of the electron image onto the photoconductor 18, a suitable yoke 41 and coil 42 surround the tube 10 throughout substantially its entire length as illustrated. The magnetic forces necessary for focus and deflection are produced by currents sent to the yoke 41 and coil 42 from suitable deflection and focus circuitry indicated by the block 44.

In operation, an optical image representing reference information stored on the reference film 24 is illuminated by back lighting 26 and is focused on the photoconductor 18 to produce a pattern of resistance values across the photoconductor film which conforms to the intensity pattern of the reference input image. Meanwhile, an optical input image representing present information is focused on the photocathode where it produces an electronic image which is then accelerated towards the photoconductor 18 by the potential applied to the field mesh 30, as set forth above. The photoconductor 18 can be considered as a plurality of resolution elements. Each resolution element of the photoconductor 18 can be considered to be a capacitor paralleled by a leakage resistance which is the dark resistance. Therefore, if a positive potential is applied from the voltage control 40 through a load resistor 46 directly to the photoconductor 18, it will insure that when no light is incident on the surface of the photoconductor 18, and after it has been flooded with electrons from the photocathode 16, each resolution element or small capacitor will be charged to the applied voltage. However, when there is an optical image input to the photoconductor 18, but not to the photocathode 16, the paralleling leakage resistance decreases according to the intensity of light on each particular resolution element, and the potential at the surface facing into the tube rises resulting in a decrease in the charge on each resolution element capacitor.

Therefore, when the electronic image from the photo cathode is focused on the inward surface of the photoconductor 18, this effectively recharges each resolution element capacitor towards the applied voltage from the load resistor 46 and the charging current flows through the load resistor 46. This charging current is proportional to the product of the intensity of the light incident on the photoconductor 18, and the intensity of the light incident on the photo cathode 16. The sum of the charging currents into all the resolution element capacitors in the photoconductor 18 thus is a measure of the correlation between the two input images, and it can be read out as a voltage across the external load resistance 46. The invention contemplates the readout into a phase discriminator 50. The phase discriminator also has a reference input from a nutation generator 52 so that it can accurately detect the quadrants or sectors of the nutation cycle where correlation is achieved at a maximum when the focused image is nutated over the inner face of the photoconductor in the usual manner for correlation techniques. In this manner, the phase discriminator does provide orthogonal error signals which are sent to integrators 54 where they are integrated, and corrective error signals 56 determined thereby.

The invention contemplates that a closed loop continuous correlation operation can be achieved by sending error correction signals 58 to the deflection circuitry to correct displacement errors between the image of the present optical input 20 and the reference input 24. Further, the error signals 56 may be utilized to appropriately correct the flight path of an aircraft, by being sent to an aircraft flight control system 60.

The spectral characteristics of the photoconductor 18 and the photocathode 16 should be selected to minimize the cross-coupling effects of light from the two input images. In addition, the photoconductor 18 is made from a film as opaque as possible to prevent its optical input image from producing another electronic image from the photocathode at the other end of the tube. However, in general, any light from either input image which might reach the sensitive element at the opposite end of the tube will not be focused image light and will be much attenuated, and therefore should not constitute any problem.

Thus, it should be understood that the electron image produced at the photo cathode 16 is accelerated towards the photoconductor 18 and focused thereon. Further, it passes through the unipotential drift space where it is deflected in nutation and matching normal to the tube axis. Since the input reference scene image is steadily focused on the surface of the photoconductor 18, the charge on each resolution element or small capacitor area of the photoconductor starts to decrease immediately after having been increased by the action of the nutating electron image from the photocathode. Thus the output signal results from correlating the images, which is developed by integrating the output of the resolution elements during the period of a nutation cycle.

As a modification to the system, the correlation may be performed when the intensity of optical present or actual input image 20 is very low, and this is an extremely desirable characteristic for most guidance system applications. To achieve this result all that is needed is to focus or apply the image 20 to the photoconductor 18 and the reference image 24 to the photocathode 16, or just the reverse of the way illustrated in FIGURE 1 and described above. This set up will work very well on low intensity optical inputs since the photoconductor integrates the input light, and ample illumination of the reference film is available and controllable to provide an optimum electron image to correlate with the low intensity input image at the photoconductor.

As an added feature, if the photoconductor is of the permachon type, the correlation process may be continued long after the input optical image has been removed, since the image remains in effect for a long period of time. The invention further contemplates that for even greater sensitivity under low light level conditions, the tube 10 may incorporate a secondary electron conduction target, hereinafter called a SEC, in place of a standard photoconductor film material. Since the SEC target material is sensitive to electronic bombardment rather than photon bombardment, the input sensitive surface must be another photo cathode which will produce an electronic image for bombarding the secondary electron conduction target. The SEC target would be mounted parallel with, but separated from, a photo cathode surface by a small distance sufficient to accelerate electrons to an energy level adequate for bombarding the SEC target. This example is illustrated in enlarged relation in FIGURE 2 where the numeral 16A illustrates a photocathode formed on a protective glass plate 12A and the numeral 70 illustrates a suitable secondary electron conduction target material in spaced parallel face-to-face relationship. This configuration could replace the photoconductor 18 of FIGURE 1. Again, the integrating properties of the photoconductor are present in the secondary electron conduction target, but with greatly increased sensitivity so that it can adequately operate under very low light levels.

Thus, it should be understood that total area correlation is very easily and accurately achieved in the tube of the invention with very low cost, and great simplicity and reliability in operation.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. An electronic area correlator tube which comprises a cylindrically shaped housing, means positioned at one end of the housing to create an electronic representation of a present optical image, target means having the properties of a plurality of resistance elements positioned at the opposite end of the housing, said means being sensitive to light on the outside and electrons on the inside to change the resistance value thereof, means to focus a reference optical image on the outside surface of said target means, means to focus the electronic representation onto the inside surface of the target means, and means to detect the change in resistance value of the total area of the target means when the images are focused on each side thereof.

2. An electronic area correlator tube according to claim 1 where field meshes are positioned in adjacent spaced relationship to the first means and photoconductor with means to control the voltage potential to the field meshes to control the acceleration of electrons from the first means towards the photoconductor and the deceleration and collimation of the electrons before they land on the photoconductor.

3. An electronic area correlator tube according to claim 1 where an unipotential drift tube is positioned between the field meshes and substantially aligned with the axis of the tube whereby deflection of electrons is accomplished in the drift tube.

4. An electronic area correlator tube according to claim 1 where the photoconductor comprises a secondary electron conduction target sensitive to an electron bombardment with a photocathode adjacent thereto to produce an electronic image for bombarding the secondary electron conduction target when an optical image is focused thereon.

References Cited

UNITED STATES PATENTS 3,290,546 12/1966 Link et al. ------------ 315—12

RODNEY D. BENNETT, Jr., *Primary Examiner.*

CHARLES E. WANDS, *Assistant Examiner.*